United States Patent
Porob et al.

(10) Patent No.: US 8,865,305 B2
(45) Date of Patent: Oct. 21, 2014

(54) CORE SHELL PHOSPHOR AND METHOD OF MAKING THE SAME

(75) Inventors: Digamber Gurudas Porob, Bangalore (IN); Alok Mani Srivastava, Niskayuna, NY (US); Holly Ann Comanzo, Niskayuna, NY (US); Gopi Chandran Ramachandran, Bangalore (IN); Prasanth Kumar Nammalwar, Bangalore (IN)

(73) Assignee: General Electric Company, Niskayuna, NY (US)

( * ) Notice: Subject to any disclaimer, the term of this patent is extended or adjusted under 35 U.S.C. 154(b) by 491 days.

(21) Appl. No.: 12/816,808

(22) Filed: Jun. 16, 2010

(65) Prior Publication Data

US 2011/0311823 A1    Dec. 22, 2011

(51) Int. Cl.
| | |
|---|---|
| C09K 11/70 | (2006.01) |
| C09K 11/77 | (2006.01) |
| B32B 9/00 | (2006.01) |
| C09K 11/02 | (2006.01) |

(52) U.S. Cl.
CPC ............. *C09K 11/02* (2013.01); *C09K 11/7777* (2013.01)
USPC ...................... 428/402.2; 428/402; 252/301.4

(58) Field of Classification Search
USPC .................. 252/301.4, 233; 428/402.24, 402, 428/402.21
See application file for complete search history.

(56) References Cited

U.S. PATENT DOCUMENTS

| | | | | |
|---|---|---|---|---|
| 3,507,804 | A | * | 4/1970 | Ropp ....................... 252/301.4 P |
| 5,746,944 | A | * | 5/1998 | Braconnier ............. 252/301.4 P |
| 5,985,173 | A | | 11/1999 | Gray et al. |
| 6,366,033 | B1 | | 4/2002 | Greci et al. |
| 7,547,888 | B2 | | 6/2009 | Cooke et al. |
| 7,651,771 | B2 | | 1/2010 | Meyer et al. |
| 2007/0054120 | A1 | * | 3/2007 | Meyer et al. ................... 428/403 |
| 2007/0212541 | A1 | | 9/2007 | Tsukada et al. |
| 2010/0051868 | A1 | * | 3/2010 | Le-Mercier et al. ... 252/301.4 R |

FOREIGN PATENT DOCUMENTS

| | | |
|---|---|---|
| WO | WO2008012266 A1 | 1/2008 |
| WO | WO2010108815 A1 | 9/2010 |
| WO | WO2010108860 A1 | 9/2010 |

OTHER PUBLICATIONS

Yunxia Yang, Chen Li, Shuanglong Yuan, Bin Fang and Guorong Chen; "Effects of Preparation Process on Decay Lifetime of LaPO4:Ce,Tb Phosphors"; Submitted Sep. 17, 2004; accepted Jan. 13, 2005; E-mail: grchen@ecust.edu.cn; 5 Pages.

* cited by examiner

*Primary Examiner* — James J Seidleck
*Assistant Examiner* — S. Camilla Pourbohloul
(74) *Attorney, Agent, or Firm* — Mary Louise Stanford

(57) ABSTRACT

A method of making a core-shell phosphor is provided. The method comprises mixing a lanthanum phosphate ($LaPO_4$) core with a shell precursor mixture comprising at least one compound of La, at least one compound of Ce, and at least one compound of Tb to form a core+shell precursor mixture, heating the core+shell precursor mixture to a temperature in a range from about 900° C. to about 1200° C. with an inorganic flux material in presence of a reductant to provide a heated core+shell precursor mixture, cooling the heated core+shell precursor mixture to ambient temperature to provide a product core-shell phosphor dispersed in the inorganic flux material; and separating the product core-shell phosphor from the inorganic flux material.

12 Claims, 1 Drawing Sheet

CORE SHELL PHOSPHOR AND METHOD OF MAKING THE SAME

BACKGROUND

Figure 1A:
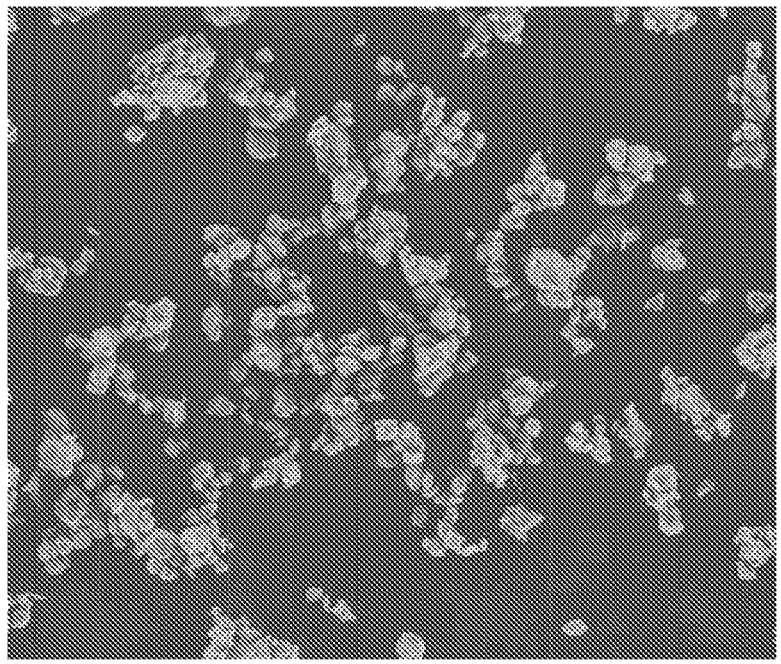

Mixed phosphates of lanthanum and/or cerium, doped with terbium (usual acronym "LAP"), are well-known phosphor compositions. A LaPO$_4$:Ce, Tb phosphor composition is known as green phosphor (LAP) as it emits a bright green light when it is irradiated by certain high-energy radiation having wavelengths below the visible range. This property is advantageously used on an industrial scale, for example, in trichromatic fluorescent lamps, backlighting systems for liquid crystal displays and in plasma systems.

Various synthesis methods have been developed to maximize the efficiency of LAP phosphor. Some of the synthesis methods improve crystallinity of LAP phosphor thereby enhancing the efficiency. Some other synthesis methods optimize the particle size distribution and morphology of phosphor particles in order to get uniform coating during lamp coating.

However, a problem still unaddressed is of their particularly high cost, linked especially to the use of terbium. A core-shell approach for phosphor has been proposed to decrease the concentration of terbium and thus to lower the cost of LAP. Hence, it is desirable to develop core-shell phosphors to meet the existing need for inexpensive, high quality phosphors. Coating of relatively inexpensive core with expensive shell materials can help lower the cost of phosphor as well as the cost of manufacturing fluorescent lamps.

TECHNICAL FIELD

The invention generally relates to a core-shell phosphor. More particularly, the invention relates to a gradient core-shell phosphor and a method for making the gradient core-shell phosphor.

BRIEF DESCRIPTION

In accordance with one aspect of the present invention, a method of making a core-shell phosphor is provided that includes the steps of (a) mixing a lanthanum phosphate (LaPO$_4$) core with a shell precursor mixture comprising at least one compound of La, at least one compound of Ce, and at least one compound of Tb to form a core+shell precursor mixture; (b) heating the core+shell precursor mixture to a temperature in a range from about 900° C. to about 1200° C. with an inorganic flux material in presence of a reductant to provide a heated core+shell precursor mixture; (c) cooling the heated core+shell precursor mixture to ambient temperature to provide a product core-shell phosphor dispersed in the inorganic flux material; and (d) separating the product core-shell phosphor from the inorganic flux material.

In accordance with another aspect, the present invention provides a light source comprising a core-shell phosphor, said core-shell phosphor being prepared by a method comprising: (a) mixing a LaPO$_4$ core with a shell precursor mixture comprising diammonium hydrogen phosphate (NH$_4$)$_2$HPO$_4$ (DAP), lanthanum oxide (La$_2$O$_3$), cerium oxide (CeO$_2$), and terbium oxide (Tb$_4$O$_7$) to form a core+shell precursor mixture; (b) heating the core+shell precursor mixture to a temperature in a range from about 900° C. to about 1200° C. with an inorganic flux material in the presence of a reductant to provide a heated core+shell precursor mixture; (c) cooling the heated core+shell precursor mixture to ambient temperature to provide a product core-shell phosphor dispersed in the inorganic flux material; and (d) separating the product core-shell phosphor from the inorganic flux material.

In accordance with another aspect, the present invention provides a core-shell phosphor composition comprising a phosphor of formula (I) La$_{1-x-y}$Ce$_x$Tb$_y$PO$_4$, (I), said composition being made by a method comprising: (a) mixing a LaPO$_4$ core with a shell precursor comprising DAP, La$_2$O$_3$, CeO$_2$, and Tb$_4$O$_7$ to form a core+shell precursor mixture; (b) heating the core+shell precursor mixture to a temperature in a range from about 900° C. to about 1200° C. with an inorganic flux material in the presence of a reductant to provide a heated core+shell precursor mixture; (c) cooling the heated core+shell precursor mixture to ambient temperature to provide a product core-shell phosphor dispersed in the inorganic flux material; and (d) separating the product core-shell phosphor from the inorganic flux material; wherein, $0 < x \leq 0.95$, and $0 < y \leq 0.5$.

Other embodiments, aspects, features, and advantages of the invention will become apparent to those of ordinary skill in the art from the following detailed description, the accompanying drawings, and the appended claims.

BRIEF DESCRIPTION OF THE DRAWING FIGURES

Figure 1B:
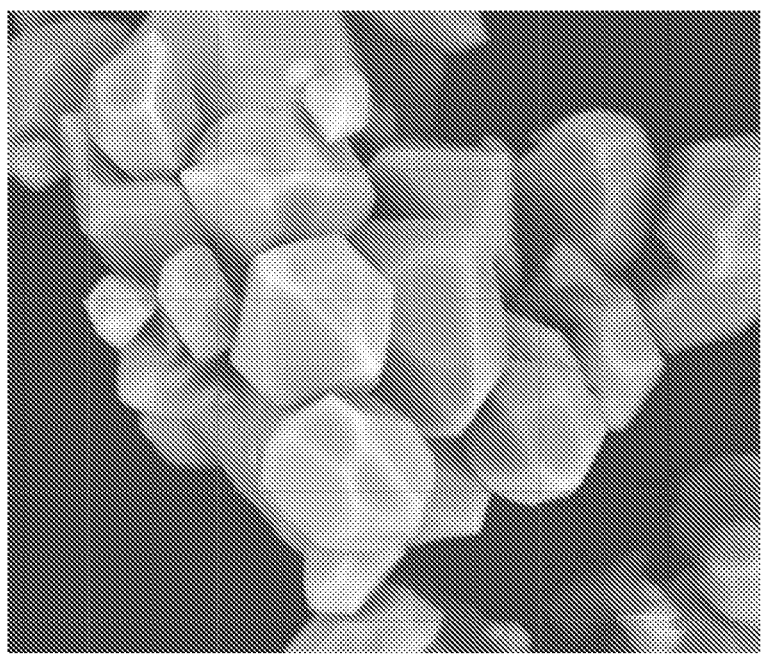

These and other features, aspects, and advantages of the present invention will become better understood when the following detailed description is read with reference to the accompanying drawings in which like characters represent like parts throughout the drawings, wherein:

FIGS. 1A and 1B are images of core-shell phosphor particles of the present invention generated by scanning electron microscope at 500× and 5000× magnification respectively.

DETAILED DESCRIPTION

As discussed in detail below, embodiments of the present invention include a method for making a core-shell phosphor, where the core-shell phosphor comprises a core, and a shell deposited on the core. The method comprises a molten salt approach to make an efficient core-shell phosphor with a low activator content compared to a non core-shell phosphor.

The singular forms "a", "an" and "the" include plural referents unless the context clearly dictates otherwise.

To more clearly and concisely describe and point out the subject matter of the claimed invention, the following definitions are provided for specific terms, which are used in the following description and the appended claims. Throughout the specification, use of specific terms should be considered as non-limiting examples.

As used herein, the term "temperature stable material" refers to a material having a melting point at high temperature, and the material does not degrade into a by-product affecting the application, for example an application of phosphor, at the same temperature. The material remains crystalline without converting into an amorphous material at the same temperature. The high temperature proposed here is a temperature of at least greater than 900° C., particularly at least greater than 1000° C.

As used herein, the term "homogeneous layer" refers to a continuous layer, completely covering the core, and the homogeneity is clearly visible on scanning electron micrographs. The material of the layer has a homogeneous distribution.

As used herein, the term "longest dimension" refers to the longest Euclidean distance between two points in a particle. For example, if the particle is spherical, the diameter is the longest dimension of the particle. For an elliptical particle, the longest dimension is the major axis of the ellipse. In hydrated form, the longest dimension of a spherical particle may be the mean or average hydrodynamic diameter of the particle. Similarly, a phosphor particle having a dimension of 1 μm refers to a phosphor particle that has a longest dimension of at least 1 μm. For a phosphor particle of irregular geometry, the size of the particle may be described in terms of its dimension, the longest Euclidean distance between two points in the particle.

In one embodiment, the present invention provides a method of making a core-shell phosphor, wherein the method comprises the step of mixing a lanthanum phosphate ($LaPO_4$) core with a shell precursor to form a core+shell precursor mixture. The shell precursor comprises at least one compound of lanthanum (La), at least one compound of cerium (Ce), and at least one compound of terbium (Tb). The core+shell precursor mixture is heated to a temperature in a range from about 900° C. to about 1200° C. with an inorganic flux material in the presence of a reductant to provide a heated core+shell precursor mixture. The heated core+shell precursor mixture is then cooled to ambient temperature to form a product core-shell phosphor, which is dispersed in the inorganic flux material. The resultant product core-shell phosphor is separated from the inorganic flux material.

As noted, the core provided by the present invention comprises at least one compound of lanthanide, which is a temperature-stable material. The core may be of various materials, which is iso structural to the shell materials, like $LaPO_4$ in the case of LAP. The core of the present invention is based on a phosphate, and more particularly a rare-earth metal phosphate, such as undoped $LaPO_4$. According to a specific embodiment, the core is mainly composed of $LaPO_4$. In some embodiments, the $LaPO_4$ core may comprise one or more rare earth metals, such as cerium, terbium, gadolinium, scandium, yttrium, or combinations thereof. For example, in one embodiment, the La of the $LaPO_4$ core may partially be substituted by cerium, terbium, gadolinium, scandium, yttrium, or combinations thereof. In one embodiment, the core may be based on a mineral oxide, for a non-limiting example, an aluminium oxide.

In various embodiments, on the surface of the core, a layer or shell based on a material of mixed La and/or Ce-phosphate, doped with Tb is deposited. In one embodiment, the shell material may comprise pure Ce-phosphate doped with Tb, which is a La-free material. The deposited material is known as shell material, which is made of a mixed LAP phosphate (La, Ce, Tb) $PO_4$. The shell is a homogeneous layer of a mixed LAP phosphate that coherently crystallizes on the core. The homogeneity of the mixed LAP phosphate distribution is especially visible on scanning electron micrographs. The mixed LAP phosphate is an effective green phosphor, where necessarily the Tb and where appropriate, the La, and Ce are in the +3 oxidation state. Reduction of Ce and Tb, from the +4 oxidation state to the +3 oxidation state has an effect of improving the luminescence properties, and in particular brightness. To assess the presence or absence of cerium and/or terbium in the +4 oxidation state is possible by a surface analysis of the product.

In one or more embodiments, for the production of shell, the starting materials used may be, for example, elemental oxides, nitrates, phosphates, carbonates, and/or hydroxides. Other starting materials may include, but are not limited to, sulfates, acetates, citrates, or oxalates. Alternately, co-precipitates or double salts of one or more of rare earth compounds may also be used as the starting materials. At least one compound of La, at least one compound of Ce, and at least one compound of Tb are used to make the shell phosphor. As noted, the compound of La, compound of Ce, and compound of Tb, are independently at each occurrence, selected from oxides, nitrates, carbonates, acetates, and combinations thereof. For a non-limiting example, compound of La may be selected from oxides, such as lanthanum-oxide, wherein the compound of Ce and/or the compounds of Tb may be selected from nitrates, such as Ce-nitrate or Tb-nitrate and vice-versa. The compound of La may be selected from carbonate, such as La-carbonate, wherein the compound of Ce and/or compound of Tb may be selected from acetates, such as Ce-acetate or Tb-acetate and vice-versa. In another non-limiting example, compound of La may be selected from oxides, such as La-oxide, wherein the compound of Ce is selected from nitrate, such as Ce-nitrate or ammonium ceric nitrate and the compound of Tb may be selected from acetate, such as Tb-acetate.

In some embodiments, the shell mixture comprises a compound of La, a compound of Ce, and a compound of Tb, which are selected from phosphates, such as, La-phosphate, Ce-phosphate, or Tb-phosphate. In one embodiment, the shell mixture may comprise a mixed phosphate of La, Ce, and Tb. The lanthanide phosphates may be mixed with $LaPO_4$ core along with fluxes and heated at 900° C. to form core-shell phosphor.

When the compound of La, compound of Ce, and compound of Tb are selected from the compounds other than phosphates, such as from oxides, nitrates, carbonates, or acetates, in certain embodiments, the compounds are converted to (La, Ce, Tb)-phosphates over the $LaPO_4$ core. In such embodiments, the shell precursor mixture further comprises DAP. The DAP (($NH_4)_2HPO_4$) converts the compound of La, compound of Ce and compound of Tb to their corresponding phosphates in the reaction mixture. The phosphate of La, phosphate of Ce and phosphate of Tb form a mixed LAP phosphate (La, Ce, Tb) $PO_4$, which is deposited on the $LaPO_4$ core. In one embodiment, for example, the shell precursor mixture comprises DAP, lanthanum oxide ($La_2O_3$), cerium oxide ($Ce_2O_3$), and terbium oxide ($Tb_4O_7$), where DAP converts $La_2O_3$, $Ce_2O_3$, and $Tb_4O_7$ to (La, Ce, Tb) $PO_4$ which is deposited on the $LaPO_4$ core.

The shell materials (La, Ce, Tb) $PO_4$ may further comprise other compounds, for example, polyphosphates of rare-earth metals, generally in a minor amount that does not exceed about 5%. According to one particular embodiment, the mixed phosphate, which crystallizes on the core may comprise one or more elements other than La, Ce, or Tb, where the elements conventionally have a role, in particular, of promoting the luminescence properties or of stabilizing the degrees of oxidation of the Ce and Tb. These additional elements may include, for example, alkali metals (Li, Na, K, in particular), thorium and boron.

The product core-shell phosphor composition provided by the present invention, comprises a phosphor of formula (I)

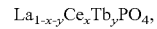

$$La_{1-x-y}Ce_xTb_yPO_4, \qquad (I);$$

wherein the value of x is in a range from about 0.05 to about 0.90, the value of y is in a range from about 0.05 to about 0.5, and (x+y) is less than about 1. In certain embodiments, for the product core-shell phosphor of formula (I), the value of x is in a range from about 0.1 to about 0.5, the value of y is in a range from about 0.1 to about 0.4, and (x+y) is less than or equal to about 1. In certain specific embodiments, for the core-shell phosphor of formula (I), the value of x is in a range from about greater than 0 to about 0.5 (0<x≤0.5), and the value of y is in a range from about greater than 0 to about 0.5 (0<y≤0.5). According to core-shell phosphor of the invention, the sum (x+y) is less than 1, so that the compound of formula (I)

contains at least certain amount of lanthanum. In one embodiment, x is between 0.05 and 0.3, and y is between 0.05 and 0.6. In another embodiment, x is between 0.1 and 0.5; y is between 0.1 and 0.3; and the sum (x+y) is between 0.2 and 0.8.

According to one embodiment of a gradient core-shell phosphor, which may be envisaged, the mixed phosphate that is present on the outermost layer of the shell (or the outer surface of the shell) of the core-shell phosphor is a Ce-free LAP, which corresponds to the formula (II) below:

(II)

wherein, y is between 0.01 and 0.3. As used herein, the outermost layer of the shell refers to the outer surface of the shell of the core-shell phosphor.

According to another embodiment of a gradient core-shell phosphor, the mixed phosphate that is present on the innermost layer of the shell of the core-shell phosphor is a mixed phosphate of La and Ce, and the phosphor is a Tb-free LAP, which corresponds to the following formula (III):

(III)

wherein, $0<x\leq 0.3$. In a specific embodiment, x is between 0.01 and 0.3. As used herein, the innermost layer of the shell refers to the inner surface of the shell or the outer surface of the core of the core-shell phosphor.

In another non-limiting example, the shell phosphor composition consists essentially of $La_{0.6}Ce_{0.27}Tb_{0.13}PO_4$. In one embodiment, the phosphor is a gradient core-shell phosphor, where Tb is used as an activator. The phosphor is configured to maintain an optimal concentration of the activator on the surface and lowering the concentration at the core. Therefore, the phosphor results in a reduction of an amount of Tb in the phosphor. In one embodiment, an atom percent of Tb in the core-shell phosphor is in a range from about 1% to about 13%. In a specific embodiment, an atom percent of Tb in the core-shell phosphor is less than about 10%.

In one exemplary process of making the core-shell phosphor, a molten salt method is used, where the raw materials (such as $LaPO_4$, DAP, $La_2O_3$, $Ce_2O_3$, $Tb_4O_7$) may be milled down to micron-sized powders and then dispersed in the inorganic flux materials, mixed thoroughly by shaking in a Nalgene bottle. The mixture of reactants and flux materials may be dispensed into an alumina crucible under vigorous mixing. The starting materials may be mixed together by any mechanical method including, but is not limited to, stirring or blending in a high-speed blender or a ribbon blender. In a typical process, the starting materials may be combined via a dry blending process. The starting materials may be combined and pulverized together in a bowl mill, a hammer mill, or a jet mill.

As noted the use of flux materials, in one embodiment, the fluxing agents or flux materials may be added to the core+shell precursor mixture before or during the step of mixing the reactants. The inorganic flux material may be selected from one or more of disodium hydrogen phosphate ($Na_2HPO_4$), sodium dihydrogen phosphate ($NaH_2PO_4$), sodium diphosphate ($Na_4P_2O_7$), sodium tetraborate, lithium tetraborate ($Li_2B_4O_7$), boron trioxide ($B_2O_3$), and boric acid. In a specific example, the inorganic flux material is a mixture of $Na_2HPO_4$, and $Li_2B_4O_7$. The inorganic flux materials may further include any other conventional fluxing agent, such as aluminium trifluoride ($AlF_3$), ammonium chloride ($NH_4Cl$). As the formation of the shell is initiated in the presence of a flux material in a molten phase, a minimum temperature is necessary to maintain the molten state of the inorganic fluxes. The melting points of the flux materials, such as, $Na_2HPO_4$, $NaH_2PO_4$, $Li_2B_4O_7$, $Na_2B_4O_7$, and boric acid are 240° C., 190° C., 917° C., 743° C., and 170° C. respectively. In the reaction medium, $Na_2HPO_4$ and $NaH_2PO_4$ are converted to $Na_4P_2O_7$, which has a melting point at 890° C. The melting point of $B_2O_3$ is in a range from about 450 to about 510° C. For example, when a flux material comprises a mixture of $Na_2HPO_4$, and $Li_2B_4O_7$, the temperature of the reaction medium is desirably maintained between 900-950° C., as the melting point of $Li_2B_4O_7$ is 917° C. and the melting point of $Na_4P_2O_7$ is 890° C. A quantity of a fluxing agent of less than about 20%, particularly less than about 10% by weight of the total weight of the mixture is, for many embodiments, is adequate for fluxing purposes.

As noted, the reducing atmosphere, reducing agent, or reductant typically comprises a reducing gas such as hydrogen, carbon monoxide, nitrogen, charcoal, or combinations thereof. The reductant is optionally diluted with an inert gas, such as nitrogen or Argon, or combinations thereof. In a specific embodiment, the reductant may comprise hydrogen, nitrogen, or combinations thereof. In one embodiment, to produce carbon monoxide atmosphere, the crucible containing the core-shell mixture may be packed in a second closed crucible containing high-purity carbon particles and fired in air so that the carbon particles react with the oxygen present in the air, thereby, generating carbon monoxide for providing a reducing atmosphere.

For core-shell phosphors, a homogeneous shell material may be formed after firing the core+shell precursor mixture between about 900° C. to about 950° C. under a reducing atmosphere (e.g. 1% $H_2$ in $N_2$). The dried core-shell mixture may be fired under a reducing atmosphere at a temperature from about 900° C. to about 1200° C., or from about 1000° C. to about 1600° C., for a time sufficient to convert all of the mixture to the final composition. As noted, the heating or firing of the core-shell mixture may be conducted in an alumina crucible using a tube furnace. The heating or firing may be conducted in a batch wise or continuous process, with a stirring or mixing action to promote adequate gas-solid contact. The firing time depends on the quantity of the mixture to be fired, the rate of gas conducted through the firing equipment, and the quality of the gas-solid contact in the firing equipment. Typically, a firing time of about 1 hour under reducing atmosphere is adequate for maximum turnover of reactant to product. The combination of fluxes may be chosen in a way to tune the solubility of $LaPO_4$ or $(La,Ce,Tb)PO_4$ in order to obtain core-shell phosphor at desired synthesis temperature.

In one embodiment, upon cooling of the heated core+shell precursor mixture to ambient temperature, the mixed LAP phosphate containing the activators Ce and Tb present in the flux material is epitaxially deposited on the $LaPO_4$ core. In a molten state of the reaction mixture, some of the reactants may be trapped in the molten flux materials. Upon cooling of the heated core-shell mixture to ambient temperature, the trapped reactants may be extracted out from the flux materials and further deposited on the core. In one embodiment, the ambient temperature may include room temperature. The product core-shell phosphor is dispersed in the inorganic flux materials, and the dispersed product is then separated from the inorganic flux materials by washing with hot water and hot dilute acid. The filtered core-shell phosphor is washed with deionized water, and dried for a sufficient time, may be for over night, in an oven to obtain the desired phosphor composition.

The product core-shell phosphor provided by the present invention comprises a particulate structure. The phosphor particle may comprise a regular geometry or an irregular geometry. The phosphor particle may be of various shapes, such as spherical, elliptical, or cubical. The dimensions of the core, shell, and the core-shell particle may especially be measured from scanning electron micrographs of sections of core or shell or core-shell particle, and from particle size analyzer. From the particle size analyzer, the diameter of the core, shell, and core-shell phosphor particle can be determined.

In some embodiments, the $LaPO_4$ core of the present invention comprises a particulate structure with a longest dimension in a range from about 0.5 μm to about 15 μm. The core-shell phosphor may have a shell of thickness in a range from about 0.1 μm to 1 μm, specifically in a range from about 0.3 μm to about 0.8 μm. The core-shell phosphor particle may have a longest dimension in a range from about 0.5 μm to about 20 μm. The core-shell phosphor may have a longest dimension between 1.5 μm and 15 μm, for example between 2 μm and 15 μm. In some embodiments, the core-shell phosphor product may be milled by using ⅛ inch yttria stabilized zirconia (YSZ) media in water in order to break any agglomerates of particle formed and get the desired particle size. This milling may be done for 1-10 minutes as per requirement.

The presence of a non-phosphor core in a core-shell phosphor may not impair the luminescence properties of the phosphors of the invention. In most cases, luminescence properties obtained from the core-shell phosphor with non-phosphor core may be similar to the luminescence properties obtained from the bulk phosphor particles. The luminescence property of a phosphor may be quantified by the conversion yield of the phosphor, which corresponds to a ratio of the number of photons emitted by a phosphor to the number of photons that form the excitation beam. The conversion yield of a phosphor is evaluated by measuring, in the visible range of the electromagnetic spectrum, the emission of a phosphor under an excitation in the UV or VUV range generally at a wavelength below 280 nm. The value of the brightness obtained for the core-shell phosphor, at emission intensity integrated between 400 and 700 nm, is then compared with that of a reference phosphor.

The core-shell phosphor provided by the present invention has intense green luminescence property for electromagnetic excitations corresponding to the various absorption fields of the product. The core-shell phosphor has a strong green emission under VUV excitation, due to strong absorption at these wavelengths by the mixed LAP phosphate, and also by the terbium ions. Thus, the core-shell phosphor based on cerium and terbium may be desirably used in lighting or display systems having an excitation source in the UV range (200-280 nm), for example around 254 nm. The core-shell phosphor has luminescence properties under an electromagnetic excitation corresponding to an absorption band of the higher-energy material. Thus, cerium has an absorption band near 254 nm.

The core-shell phosphor may be used in UV excitation devices, such as in trichromatic lamps, especially in mercury vapor trichromatic lamps, lamps for backlighting liquid crystal systems, plasma screens, xenon excitation lamps, devices for excitation by light-emitting diodes (LEDs), fluorescent lamps, cathode ray tube, plasma display device, liquid crystal display (LCD), and UV excitation marking systems. The core-shell phosphor may also be used as a scintillator in an electromagnetic calorimeter, in a gamma ray camera, in a computed tomography scanner or in a laser. These uses are meant to be merely exemplary and not exhaustive.

EXPERIMENTAL PART

Practice of the invention will be more fully understood from the following examples, which are presented herein for illustration only and should not be construed as limiting the invention in any way.

The following series of examples present the synthesis of a reference LAP phosphor and the synthesis methods for core-shell phosphors by molten salt approach in accordance with some embodiments of the present invention. A comparative analysis of the characterization studies of the core-shell phosphors prepared using these synthesis methods, with respect to the reference LAP phosphor, is also presented.

Materials: High purity lanthanum oxide ($La_2O_3$) (99.995%), and terbium oxide ($Tb_4O_7$) (99.99%) were purchased from Pacific Industrial Development Corp (PIDC), MI, US and used without further purification. High purity cerium oxide ($CeO_2$) (99.9%), and lithium tetra borate ($Li_2B_4O_7$) (98+%) were purchased from Sigma-Aldrich, MO, US. Diammonium hydrogen phosphate (DAP, $(NH_4)_2HPO_4$) (99%) and disodium hydrogen phosphate ($Na_2HPO_4$) (99%) were purchased from Merck, NJ, US. Mixed lanthanum phosphate, $La_{0.24}Ce_{0.5}Tb_{0.26}PO_4$ was purchased from Rhodia, Courbevoie, France. Mixed lanthanum oxide was synthesized in-house using LAP phosphor obtained from GE lighting. $La_2O_3$ was preheated at about 1000° C. for 24 hours prior to use. All the raw materials were sieved through 325 mesh.

Method: Synthesis of reference LAP phosphor-A reference LAP phosphor with target composition $La_{0.6}Ce_{0.27}Tb_{0.13}PO_4$ was synthesized, which was used as a control sample. The reference LAP phosphor contained only the shell material. For synthesizing reference LAP phosphor, about 2.0649 g $La_2O_3$, about 0.9817 g $CeO_2$, about 0.5133 g $Tb_4O_7$, about 2.8458 g $(NH_4)_2HPO_4$, about 0.5998 g $Na_2HPO_4$ and about 0.0343 g $Li_2B_4O_7$ were milled in a 60 ml nalgene bottle filled with 25% volume ¼ inch YSZ media for 5 hours. After this, the mixture was separated from YSZ media by sieving through 325 mesh. $Na_2HPO_4$ and $Li_2B_4O_7$ were used as flux materials. This mixture was then fired in a tube furnace at about 1000° C. for 5 hours. The product was boiled in about 400 mL water in a beaker, followed by boiling with about 400 mL 0.5% $HNO_3$. The LAP phosphor product after boiling in acid, was filtered using Whatman filter paper (No. 5), washed with deionized water and dried in an oven at 60° C. for over night to provide the final product of reference LAP phosphor.

EXAMPLE 1

Synthesis of $LaPO_4$ Core from $LaPO_4$ Core Precursor

Synthesis of $LaPO_4$ core precursor: For synthesizing $LaPO_4$ core precursor, about 74.5571 g of $La_2O_3$ and about 61.6518 g of $(NH_4)_2HPO_4$ were milled in a 500 mL nalgene bottle filled with 50% volume ¼ inch YSZ media for 5 hours. After this the powder was separated from YSZ media by sieving through 325 mesh. The mixture was fired in a box furnace under atmospheric conditions at about 900° C. with zero hour dwell time. The product $LaPO_4$ core precursor was collected, and characterized by X-ray diffraction. The X-ray diffraction study determined that the product $LaPO_4$ core precursor was of monazite structure.

Synthesis of $LaPO_4$ core: To synthesize $LaPO_4$ core by increasing the growth of the precursor core particle, about 91 g of the $LaPO_4$ core precursor and 11.05 g of $Na_2HPO_4$ were milled for 5 hours in a 500 mL nalgene bottle filled with 50% volume ¼ inch YSZ media. After this the powder was separated from YSZ media by sieving through 325 mesh. The mixture was fired in a tube furnace at about 950° C. for 2 hours. $Na_2HPO_4$ was used as a flux material. The product $LaPO_4$ core was then boiled in water, washed repeatedly with deionized water, and dried in an oven at 60° C. for over night. The product LaPO$_4$ core was characterized by X-ray diffraction, which showed monazite structure with higher particle size. The particle size D$_{50}$ was 5.4 µm.

EXAMPLE 2

Synthesis of a LaPO$_4$—(LaCeTb)PO$_4$ Core-Shell Phosphor with 50% Low Tb, and Using Individual Lanthanide Oxides For synthesizing core-shell phosphor, 50% low Tb compared to a reference LAP phosphor was used. Here, core-shell phosphor with 50% low Tb refers to a core-shell phosphor having an atomic weight of Tb which is 50% less compared to the atomic weight of Tb present in the reference LAP phosphor. The shell was synthesized using individual lanthanide oxides, such as La$_2$O$_3$, CeO$_2$, or Tb$_4$O$_7$. LaPO$_4$ core was coated with a shell mixture comprising reactants La$_2$O$_3$, CeO$_2$, Tb$_4$O$_7$, and (NH$_4$)$_2$HPO$_4$ and the inorganic flux materials Na$_2$HPO$_4$ and Li$_2$B$_4$O$_7$.

About 2.5 g LaPO$_4$ core, prepared as described above, was used to make a core-shell phosphor. The core-shell mixture was prepared by mixing about 2.5 g LaPO$_4$ core, about 1.0341 g La$_2$O$_3$, about 0.4916 g CeO$_2$, about 0.2571 g Tb$_4$O$_7$, and about 1.4251 g (NH$_4$)$_2$HPO$_4$, about 0.6039 g Na$_2$HPO$_4$ and about 0.0345 g Li$_2$B$_4$O$_7$ in a 60 ml Nalgene bottle, followed by gentle shaking for about 2 to 5 mins. The core-shell mixture was transferred to an alumina crucible, and fired in a tube furnace at about 935° C. in presence of 1% H$_2$ (99% N$_2$) for about 1 hour. The rare earth components (lanthanide oxides) were converted to (La, Ce, Tb) PO$_4$, which formed the shell materials, deposited on the isostructural LaPO$_4$ core as a homogeneous coating. The heated core-shell product was cooled to ambient temperature to extract out remaining shell materials that were trapped in the inorganic flux material and further deposited on the core. The product core-shell phosphor was thus dispersed in the flux material. The product core-shell phosphor was boiled in about 400 ml water, followed by boiling with about 400 ml 0.5% HNO$_3$. The core-shell phosphor was then filtered using Whatman (no. 5) filter paper to remove flux materials or other impurities present in the product. The filtered core-shell phosphor was then collected and washed repeatedly with deionized water, till the residue showed a pH of about 7. The water-soluble materials were carried away from the reaction medium with the water-wash. Finally, the core-shell phosphor product was dried in an oven at 60° C. for over night to obtain the dry core-shell phosphor.

EXAMPLE 3

Synthesis of a LaPO$_4$—(LaCeTb)PO$_4$ Core-Shell Phosphor with 30% Low Tb, and Using Individual Lanthanide Oxides The core-shell phosphor LaPO$_4$—(LaCeTb)PO$_4$ was synthesized using the same procedure as described in Example 2, except for the use of about 30% low Tb compared to the reference core-shell phosphor. To make a core-shell mixture, about 2.5 g LaPO$_4$ core was mixed with about 0.7527 g La$_2$O$_3$, about 0.6832 g CeO$_2$, about 0.3572 g Tb$_4$O$_7$, about 1.4146 g (NH$_4$)$_2$HPO$_4$, about 0.6016 g Na$_2$HPO$_4$ and about 0.0344 g Li$_2$B$_4$O$_7$ in a 60 ml nalgene bottle followed by shaking for about 2 to about 5 mins. The core-shell mixture was transferred to an alumina crucible and was fired at 935° C. in a tube furnace in presence of 1% H$_2$(N$_2$) for 1 hour to form product core-shell phosphor. The product core-shell phosphor was boiled in about 400 ml water, followed by boiling with about 400 ml 0.5% HNO$_3$ to form washed core-shell phosphor. The washed core-shell phosphor was filtered, and dried (as described above) before use.

EXAMPLE 4

Synthesis of a LaPO$_4$—(LaCeTb)PO$_4$ Core-Shell Phosphor with 30% Low Tb, Using Mixed Oxides LaPO$_4$—(LaCeTb)PO$_4$ core-shell phosphor was synthesized using the same procedure as described in Example 3, except for using (La,Ce,Tb)-oxide (mixed oxide) recovered from waste LAP phosphor (application Ser. No. 12/710,601). About 2.5 g of LaPO$_4$ core was mixed with 1.78 g (La,Ce,Tb)-oxide, 1.4146 g (NH$_4$)$_2$HPO$_4$, 0.6039 g Na$_2$HPO$_4$ and 0.0345 g Li$_2$B$_4$O$_7$ to synthesize the core-shell phosphor. This mixture was fired at about 950° C. for about 1 hour. The product obtained was boiled in about 400 mL water, followed by boiling with about 400 mL 0.5% HNO$_3$. The final product was filtered, washed with water and dried.

EXAMPLE 5

Synthesis of a LaPO$_4$—(LaCeTb)PO$_4$ Core-Shell Phosphor with 30% Low Tb, and Using Mixed Phosphates LaPO$_4$—(LaCeTb)PO$_4$ core-shell phosphor was synthesized using the same procedure as described in Example 4, except for the use of (La,Ce,Tb)-phosphate instead of (La,Ce,Tb)-oxide. The shell was synthesized using (LaCeTb)PO$_4$ and 30% low Tb (atomic weight) compared to the reference LAP phosphor. To form a core-shell mixture, about 3.2219 g LaPO$_4$ core, about 1.778 g La$_{0.24}$Ce$_{0.5}$Tb$_{0.26}$PO$_4$, about 0.6017 g Na$_2$HPO$_4$ and about 0.0344 g Li$_2$B$_4$O$_7$ were mixed in a 60 ml nalgene bottle, by shaking for about 2 to about 5 mins. This core-shell mixture was transferred to an alumina crucible and was fired in a tube furnace at about 935° C. for about 1 hour. The product core-shell phosphor obtained was boiled in about 400 mL water, followed by boiling with about 400 mL 0.5% HNO$_3$. The final product was filtered, washed with water and dried.

EXAMPLE 6

Synthesis of a LaPO$_4$—(LaCeTb)PO$_4$ Core-Shell Phosphor with 50% Low Tb, and Using Mixed Phosphates LaPO$_4$—(LaCeTb)PO$_4$ core-shell phosphor was synthesized using the same procedure as described in Example 5, except for the use of 50% low Tb (atomic weight) compared to the reference LAP phosphor. To form a core-shell mixture, about 3.73 g of LaPO$_4$ core, about 1.27 g La$_{0.24}$Ce$_{0.5}$Tb$_{0.26}$PO$_4$, about 0.6032 g Na$_2$HPO$_4$ and about 0.0345 g Li$_2$B$_4$O$_7$ were mixed in a 60 ml nalgene bottle by shaking for about 2 to about 5 mins. This core-shell mixture was transferred to an alumina crucible and was fired in a tube furnace at about 935° C. for about 1 hour. The product obtained was boiled in about 400 mL water, followed by boiling with about 400 mL 0.5% HNO$_3$. The final product was filtered, washed with water and dried.

Characterization of Core-Shell Phosphor Particles:

The core-shell phosphor particles prepared were characterized by measuring particle size, morphology, and phase formation. The reference LAP phosphor was used as a control sample in each case.

Core-Shell Phosphor Particle Size Measurement:

For determining particle size (particle diameter), core-shell phosphor samples from the examples described above were first subjected to a pre-analysis preparation step and then subjected to a particle size analyzer. The phosphor samples were dispersed in water to form a suspension, and the suspension was subjected to ultrasound treatment (130 W) for 1-2 min. Ultrasound treatment improves the dispersion of the phosphor samples by deagglomeration and increases the uniformity. The particle diameter was measured using a laser particle size analyzer (Malvern Mastersizer 2000—Hydro 200S). The particle diameters were in the range from about 1 µm to about 15 µm.

Core-Shell Phosphor Particle Morphology

The core-shell phosphor particle morphology was analyzed using a FEI Quanta scanning electron microscope using a backscatter detector, as shown in FIGS. 1A and 1B. The scanning electron microscope patterns of the core-shell phosphors were compared with the pattern of reference LAP phosphor. FIGS. 1A and 1B showed the core-shell phosphors with uniform morphology without having any anomalous features.

Core Shell Phosphor Crystal Structure:

The powder X-ray diffraction patterns were obtained using PANalytical diffractometer with Cu—$K_\alpha$ radiation in Bragg-Brentano geometry. The X-ray diffraction study was performed using the $K_\alpha$ line with copper (Cu) as an anticathode according to the Bragg-Brentano method. The core-shell phosphor particles were sieved through 325 mesh prior to the X-ray diffraction study. The X-ray diffraction patterns of the core-shell phosphor were compared with the reference phosphor. The core-shell phosphor showed uniform phase distribution with monazite structure.

Photoluminescence Measurements:

The photoluminescence of the product core-shell phosphor was measured using a F4500 Hitachi fluorescence spectrophotometer, at room temperature. The photoluminescence yield of the core-shell phosphor was measured for excitation at 254 nm wavelength. The photoluminescence yield was calculated by integrating the emission intensity between 400 nm and 700 nm. The emission intensity of core-shell phosphor was compared with the reference phosphor. The results of the measurements are presented in Table 1 below.

TABLE 1

Photoluminescence yield of reference LAP phosphor and core-shell phosphors synthesized by above examples.

| Samples | Amount of Tb used | Photoluminescence yield |
|---|---|---|
| Reference LAP Phosphor | 102 g of $Tb_4O_7$/Kg of final phosphor | 100 |
| Phosphor from Example 2 | 51 g of $Tb_4O_7$/Kg of final phosphor | 90 |
| Phosphor from Example 3 | 71 g of $Tb_4O_7$/Kg of final phosphor | 102 |
| Phosphor from Example 4 | 71 g of $Tb_4O_7$/Kg of final phosphor | 95 |
| Phosphor from Example 5 | 71 g of $Tb_4O_7$/Kg of final phosphor | 105 |
| Phosphor from Example 6 | 51 g of $Tb_4O_7$/Kg of final phosphor | 98 |

What is claimed is:

1. A method of making a core-shell phosphor, the method comprising:
    (a) mixing a lanthanum phosphate ($LaPO_4$) core with a shell precursor mixture comprising at least one compound of La, at least one compound of Ce, and at least one compound of Tb to form a core+shell precursor mixture under non-aqueous condition;
    (b) heating the core+shell precursor mixture to a temperature in a range from about 900° C. to about 1200° C. with an inorganic flux material in presence of a reductant to provide a heated core+shell precursor mixture;
    (c) cooling the heated core+shell precursor mixture to ambient temperature to provide a product core-shell phosphor dispersed in the inorganic flux material; and
    (d) separating the product core-shell phosphor from the inorganic flux material,
    wherein the method is effected through a molten salt method.

2. The method according to claim 1, wherein the $LaPO_4$ core comprises a rare earth metal selected from the group consisting of cerium, terbium, gadolinium, scandium, lutetium, yttrium, and combinations thereof.

3. The method according to claim 1, wherein the shell precursor mixture further comprises diammonium hydrogen phosphate (DAP).

4. The method according to claim 1, wherein the product core-shell phosphor has a formula $La_{1-x-y}Ce_xTb_yPO_4$, wherein x is in a range from about 0.05 to 0.95, y is in a range from about 0.05 to about 0.5, and (x+y) is less than about 1.

5. The method according to claim 1, wherein the product core-shell phosphor has a formula $La_{1-x-y}Ce_xTb_yPO_4$, wherein x is in a range from about 0.1 to about 0.5, y is in a range from about 0.1 to about 0.4, and (x+y) is less than about 1.

6. The method according to claim 1, wherein an atom percent of Tb in the core-shell phosphor is in a range from about 1% to about 13%.

7. The method according to claim 1, wherein an atom percent of Tb in the core-shell phosphor is less than about 10%.

8. The method according to claim 1, wherein the reductant comprises hydrogen, nitrogen, or charcoal.

9. The method according to claim 1, wherein the reductant is hydrogen.

10. The method according to claim 1, wherein the inorganic flux material is a mixture of disodium hydrogen phosphate, and lithium tetra borate.

11. The method according to claim 1, wherein the compound of La, compound of Ce, and compound of Tb, are independently at each occurrence, selected from the group consisting of oxides, nitrates, carbonates, acetates, phosphates, oxalates, and combinations thereof.

12. The method according to claim 1, wherein the shell precursor mixture comprises DAP, $La_2O_3$, $CeO_2$, and $Tb_4O_7$.

* * * * *